L. N. CLIFTON.
SADDLE FOR ENGINES.
APPLICATION FILED FEB. 10, 1919.

1,386,924.

Patented Aug. 9, 1921.
2 SHEETS—SHEET 1.

Inventor
L. N. Clifton
By Victor J. Evans
Attorney

L. N. CLIFTON.
SADDLE FOR ENGINES.
APPLICATION FILED FEB. 10, 1919.
1,386,924.
Patented Aug. 9, 1921.
2 SHEETS—SHEET 2.
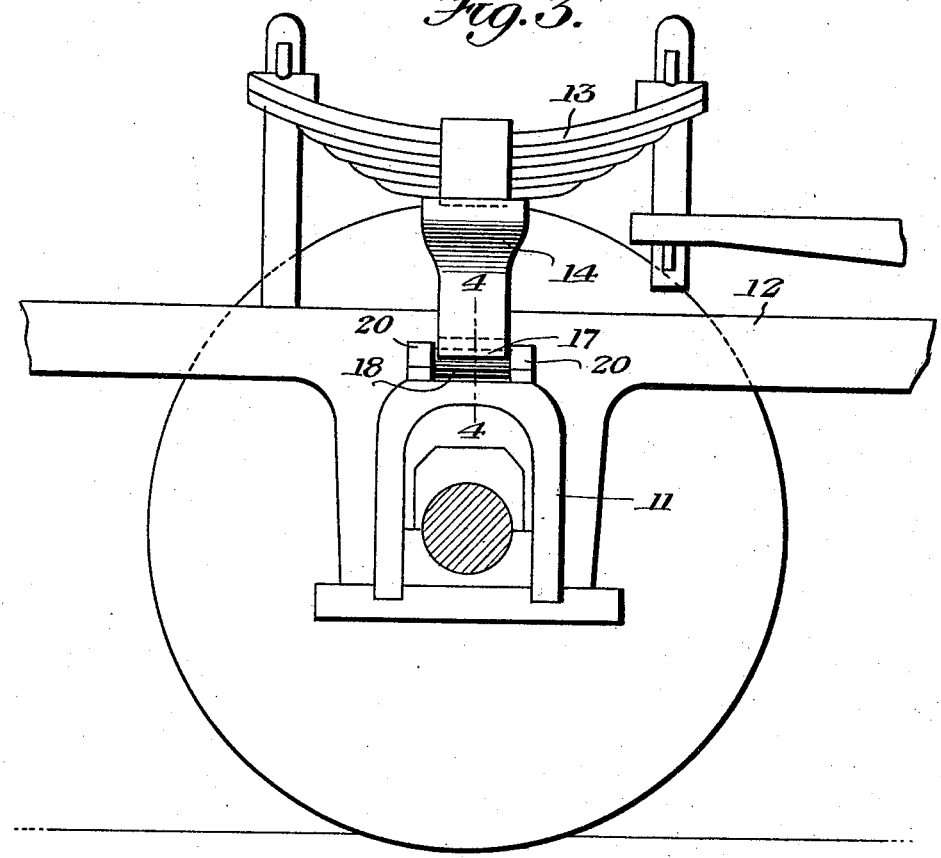
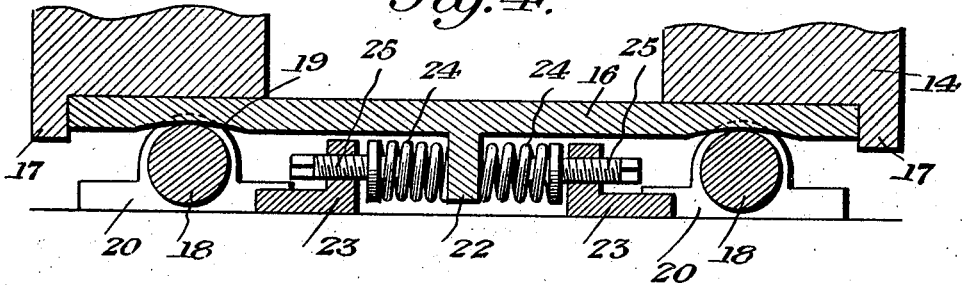
Inventor
L. N. Clifton
By Victor J. Evans
Attorney

UNITED STATES PATENT OFFICE.

LONNIE N. CLIFTON, OF RALEIGH, NORTH CAROLINA.

SADDLE FOR ENGINES.

1,386,924.  Specification of Letters Patent.  Patented Aug. 9, 1921.

Application filed February 10, 1919. Serial No. 276,102.

*To all whom it may concern:*

Be it known that I, LONNIE N. CLIFTON, a citizen of the United States, residing at Raleigh, in the county of Wake and State of N. C., have invented new and useful Improvements in Saddles for Engines, of which the following is specification.

This invention relates to locomotives, and especially to means for mounting the spring saddles upon a journal box of locomotive drivers, and while the invention is especially designed for this purpose, it is susceptible of use in other connections, such as trailer journal boxes.

An object of the present invention is to provide a device of this character which will reduce wear upon the front driver tires, hub liners, crown brasses and springs, by relieving these elements of the force of the lateral strain when the engine takes a curve, in addition to reducing friction at the curve and danger of the wheels leaving the rails, the construction causing the drivers to take the curve with less impact or centrifugal force.

Other objects and advantages of the invention will appear as the following description is read in connection with the accompanying drawings.

In the drawings:

Fig. 3 is a sectional view on the line 3—3 of Fig. 1.

Fig. 4 is a sectional view on the line 4—4 of Fig. 3.

Referring to the drawings in detail, like characters of reference denote corresponding parts throughout the several views.

Figure 1:
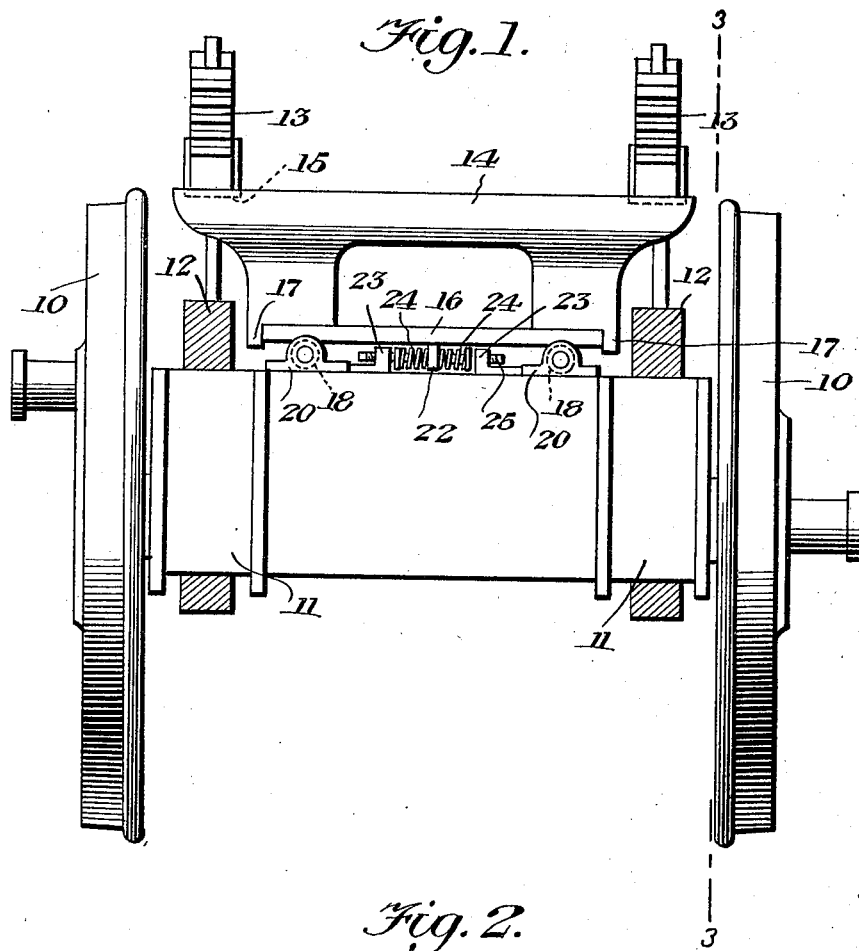
Figure 1 is a view looking at the side of a locomotive drive box, the driver wheels being shown in position at each end thereof, and the spring saddle mounted above the said box.
Figure 2:
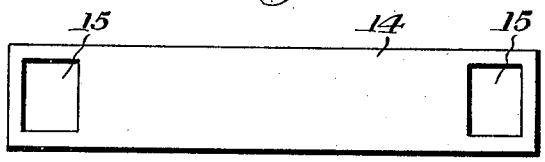
Fig. 2 is a plan view of the same.
Figure 5:
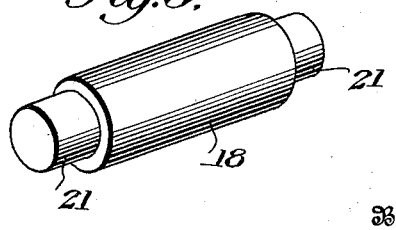
Fig. 5 is a detail perspective view of one of the rollers.

As illustrated in the accompanying drawings, the invention is applied to the journal boxes of locomotive drivers, the drive wheels being indicated at 10. The journal boxes are shown at 11 and may be of any suitable construction, being secured to a truck frame 12 and connected as shown. The supporting springs are indicated at 13, and these springs are mounted at each end of a double spring saddle 14, seats 15 being provided on the saddle for this purpose. The saddle 14 has positioned therebetween a bar 16, this bar extending entirely across the bottom of the saddle between the depending end lugs 17. Positioned between the bar 16 and the top of the journal boxes 11, or other connecting means, are rollers 18, one of these rollers being mounted beneath the bar 16 near each end thereof. The under surface of the bar 16 is preferably concaved near each end, as shown at 19 and the rollers 18 are adapted to be positioned within these concavities, the purpose being to aid in centering the saddle over the journal boxes. The rollers 18 are mounted in bearings 20, carried by the journal box connecting means, these rollers being reduced at each end, as indicated at 21, so as to provide shoulders against which the bearings 20 are positioned.

To yieldingly maintain the proper relative position between the saddle and journal boxes, the bar 16 has depending therefrom at a point intermediate its length, a lug 22, while carried by the journal box connecting means and positioned upon opposite sides of the lug 22, are lugs 23. Interposed between these lugs and the lug 22 upon each side of the latter are coiled springs 24. These springs serve to properly center the saddle above and between the journal boxes and when relative movement between the parts is occasioned by the engine striking a curve, or for any other reason, the springs permit of the saddle moving longitudinally for an appreciable distance and thereafter return the saddle to its proper position. Adjusting screws 25 are provided for regulating the tension of the springs.

It is believed that when the foregoing description is read in connection with the accompanying drawings, the construction, operation and advantages of the invention will be apparent. Various changes may be made in the form, proportions and minor details of construction and the right is herein reserved to make such changes as properly fall within the scope of the appended claims.

Having described the invention, what is claimed is:

1. The combination with a locomotive journal box, of a spring saddle positioned above the same, anti-friction devices interposed between the journal box and saddle, a lug positioned intermediate the ends of the saddle and springs carried by the journal box and engaging opposite sides of the lug to yieldingly maintain the journal box and saddle in proper relative position.

2. The combination with a locomotive journal box, of a spring saddle positioned above the same, anti-friction rollers disposed transversely of the journal box for contact with the saddle, a bar positioned longitudinally of the saddle beneath the same, means for connecting the bar and saddle, anti-friction rollers disposed transversely of the journal box for engagement with concavities provided in the lower surface of the bar, a lug depending from said bar and positioned between said rollers, lugs carried by said journal box and located upon and spaced from opposite sides of the first mentioned lug, a spring located upon each side of said first mentioned lug and interposed between the latter and the journal box lug and means for tensioning the springs to control the relative movement of the journal box and saddle.

In testimony whereof I affix my signature.

LONNIE N. CLIFTON.